(12) United States Patent
Eccles et al.

(10) Patent No.: US 6,420,164 B1
(45) Date of Patent: Jul. 16, 2002

(54) BIODECONTAMINATION REACTOR

(75) Inventors: Harry Eccles, Preston; Theresa Elizabeth Kearney, Kentworth; Trevor Simon Ngawoofah, Preston, all of (GB)

(73) Assignee: British Nuclear Fuels PLC, Warrington (GB)

( * ) Notice: Subject to any disclaimer, the term of this patent is extended or adjusted under 35 U.S.C. 154(b) by 0 days.

(21) Appl. No.: 09/152,415

(22) Filed: Sep. 14, 1998
(Under 37 CFR 1.47)

Related U.S. Application Data

(63) Continuation of application No. PCT/GB97/00691, filed on Mar. 13, 1997.

(51) Int. Cl.[7] .................................. C12S 13/00
(52) U.S. Cl. ................. 435/262; 435/294.1; 435/297.1; 588/231
(58) Field of Search .............................. 435/262, 262.5, 435/294.1, 297.1; 588/17, 231

(56) References Cited

FOREIGN PATENT DOCUMENTS

| DK | 9300023 | 3/1993 | |
|----|---------|--------|--|
| US | 4522723 | 6/1985 | .................. 210/611 |
| WO | 9413413 | 6/1994 | |
| WO | 9522375 | 8/1995 | |

*Primary Examiner*—David A. Redding
(74) *Attorney, Agent, or Firm*—Gunn & Associates, P.C.

(57) ABSTRACT

A composite bioreactor and a method of using same is described. The bioreactor (10) comprises a combination of a sulfur oxidizing bacteria (SOB) bioreactor (12) directly on top of a sulphate reducing bacteria (SRB) bioreactor (14); the SOB bioreactor (12) comprising a heap of said soil to be remediated and having suitable microorganisms therein to react with degrade contained contaminants; said SRB bioreactor comprising trough means (18) having support means to support said soil heap associated with an opening thereof, said support means having permeable membrane (16) associated therewith to allow passage of liquid but substantially no soil and sulfur reducing bacteria within said trough means (18); and liquid and nutrient supply means to promote growth of said sulfur oxidizing bacteria and said sulphate reducing bacteria within said composite bioreactor.

20 Claims, 1 Drawing Sheet

BIODECONTAMINATION REACTOR

Figure 1:
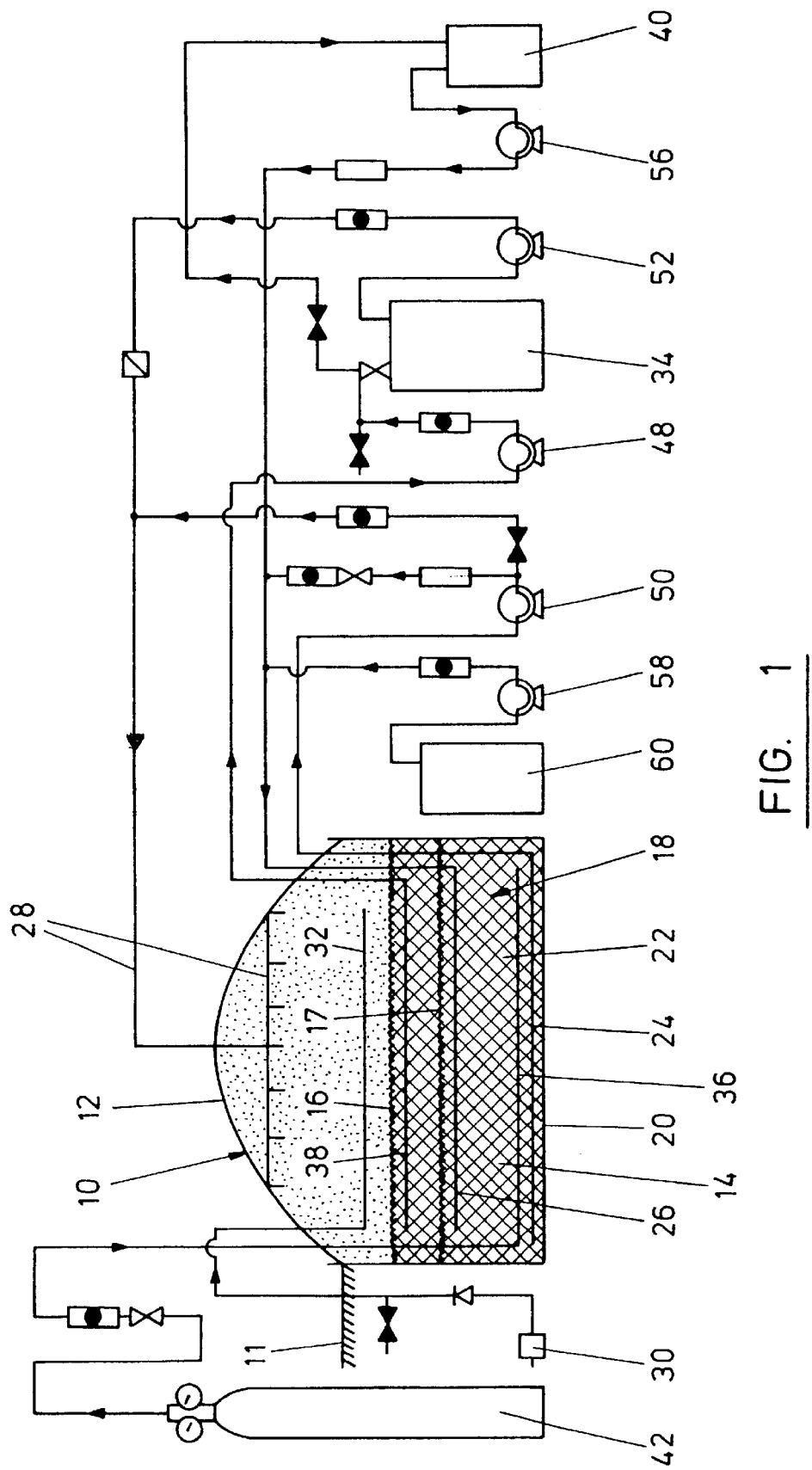

This application is a continuation of international application PCT/GB97/00691, filed Mar. 13, 1997.

BACKGROUND

The present invention relates to a method and means for remediation of contaminated soil by biodecontamination techniques.

WO95/22374, WO95/22375 and WO95/22418 of common ownership herewith describe processes for the decontamination of material and land in-situ. Whilst these processes operate satisfactorily, they require considerable capital investment in plant and manpower and are unsuitable for larger sites needing decontamination.

It is an object of the present invention to provide an efficient and economic method and means for the biodecontamination of soil having one or more of: toxic heavy metals; metals; and, organic contaminants, without the necessity for heavy capital plant expenditure.

According to a first aspect of the present invention, there is provided a method for the remediation of soil polluted by one or more organic species and/or one or more metal species by biodecontamination techniques, the method comprising the steps of providing trough means, said trough means being impervious to acidic and alkaline liquors; providing support means at an opening of said trough means, said support means having a permeable membrane associated therewith; heaping soil to be decontaminated on top of said permeable membrane; said soil having therein sulfur oxidizing bacteria micro-organisms; optionally providing aerobic conditions and conditions to promote growth of micro-organisms to initially degrade organic contaminants within said soil heap where one or more organic contaminant species are present; maintaining said optional conditions until said one or more organic contaminants have been degraded; then, providing a supply of nutrient and liquid to said soil under conditions to promote growth of said sulfur oxidizing bacteria micro-organisms and generation of sulfuric acid to promote conversion of said one or more metal species to a sulphate; collecting a sulphate leachate in said trough means which has been provided with sulphate reducing bacteria and nutrient under conditions to promote growth of said sulphate reducing bacteria; and converting said sulphate leachate to a metal sulphide.

According to a second aspect of the present invention there is provided a composite bioreactor for the remediation of soil containing one or more organic species and/or one or more metal species, the bioreactor including a combination of a sulfur oxidizing bacteria (SOB) bioreactor directly on top of a sulphate reducing bacteria (SRB) bioreactor; the SOB bioreactor comprising a heap of said soil to be remediated and having suitable micro-organisms therein to react with and degrade contained contaminants; said SRB bioreactor comprising trough means having support means to support said soil heap associated with an opening thereof, said support means having a permeable membrane associated therewith to allow passage of liquid but substantially no soil and, sulphate reducing bacteria within said trough means; and, liquid and nutrient supply means to promote growth of said sulfur oxidizing bacteria and said sulphate reducing bacteria within said composite bioreactor.

It will be understood that the sulfur oxidizing bacteria need a source of oxidisable sulfur to provide an energy source. Where this is not already present in the soil to be decontaminated, such a source will need to be added to the soil, e.g. elemental sulfur or other sulfur compounds. Similarly, it will be understood that sulfur reducing bacteria normally require a carbon source which could be, for example, ethanol, lactate, certain organic pollutants (including, for example, volatile organic compounds—VOC's phenol(s), chlorinated aromatic compounds) or combinations thereof; where these are not present, for example due to destruction by the optional organic degradation step, they will need to be added to the leachate in the trough. The SRB reactor can thus be arranged to act to degrade polluting organic materials which have survived the SOB and any preliminary degradation within the soil heap.

In addition to the production of sulphides by the SRB, it is possible that soluble sulfur compounds will be produced, typically as sulphites. These may be returned to the SOB to provide sulfur, either directly or after a preliminary oxidation step, as appropriate for optimum operation of the bioreactor.

Preferably, the trough means may comprise a pit excavated into the ground surface and, for example, lined with a suitable impermeable plastics sheet material membrane resistant to the effects of, for example, sulphuric acid, ethanol, alkaline sulphide and hydrogen sulphide. The dimensions of the trough are dependent upon the amount of soil to be remediated and the size of the site on which the remediation is to be carried out.

Alternatively, the trough means may be constructed of concrete slabs or some other suitable cheap material on the ground surface.

The trough support means may be any suitable packing material such as rubble, pebbles, broken masonry, stones or gravel or a mixture of any or all of them for example. The support packing material may be approximately level with the ground and be of sufficient porosity to allow movement or circulation of liquor therein at least over restricted areas of the trough means.

Alternatively, the support means may comprise a metal grid spanning the opening of the trough and having a permeable membrane to substantially prevent soil from entering the trough.

Preferably, the support means also comprises or is associated with an impermeable membrane to maintain the integrity of the two reactors. When this is absent, it is possible to allow leachate to pass through the permeable membrane directly to the trough, but when it is present, it is necessary to make provision for passage of the leachate from the soil heap to the SRB, e.g. by passages through, or bypassing, the impermeable membrane, or by conduits and pumps.

The main function of the support means or packing in the SRB bioreactor is to support the soil heap in the SOB bioreactor above. It also facilitates the development and growth of an SRB biofilm.

The soil heap may be up to 2 m in height or any suitable height consistent with the width of the trough and stability of the soil heap.

The trough means and the soil heap may be provided with extraction and/or supply conduits therein to extract or supply liquids, nutrients, acids, alkalis and gases (such as air for example) as appropriate. The conduits may have suitable pump or suction means associated therewith to allow supply or extraction of liquids and/or gases. For example, the trough means may have conduits arranged to extract and pump back liquors to promote circulation and mixing thereof in the SRB bioreactor.

The SRB bioreactor may have supply/extraction conduits arranged in two or more different levels of the trough means.

For example, conduits may be provided to encourage circulation/distribution of ethanol, for example, as a source of carbon for the SRB in the trough; and, the distribution of an alkali such as sodium hydroxide throughout the trough.

The SRB bioreactor will also be provided with liquid extraction conduits near to its base and near to its top for recirculation and so as to be able to take-off liquors for introduction (after treatment if necessary) into the soil heap. With respect to the lower liquid off-takes, it is advantageous if the base of the trough slopes slightly towards such offtakes.

Similarly, the soil heap of the SOB bioreactor may have supply conduits arranged therein by burying, at several different levels (optional) so as to control, for example, addition of reduced sulfur form, i.e. recycle liquor or gases from the SRB reactor. Such supplies may be provided in a continuous or discontinuous form.

A particular advantage of the bioreactor of the present invention is that the soil heap around the edges of the trough means may be used to effect a gas seal to substantially prevent hydrogen sulphide resulting from the conversion of sulphate to sulphide in the SRB bioreactor from escaping into the atmosphere. This is effected by extending the impermeable membrane inside the trough means to the outside thereof to lie flat on the ground and to have the outer periphery of the soil heap overlying the flat area. Hydrogen sulphide may be directed back into the soil heap where it reacts with other chemical constituents to provide a sulfur source to promote growth of the SOB. Thus, contamination of the atmosphere surrounding the composite bioreactor is substantially negated.

With the passage of time the organic contaminants in the soil heap are first degraded into harmless or less harmful species and the metal contaminants are eventually leached out of the soil and fed into the SRB bioreactor from where they may be retrieved in the form of a sulphide sludge and further processed for recovery or disposed of in a known manner. Once the contaminants have been removed from the soil heap it may be removed and reutilised by spreading on the land and a further batch of contaminated soil heaped onto the SRB bioreactor and processed gas above. This process may be repeated until all the soil on the site for remediation has been decontaminated. If necessary, further treatment is carried out on the decontaminated soil before it is reutilised, e.g. adjustment using lime, and/or addition of composting materials.

It will be understood that although mention has been made of a soil heap over the SRB, the composition and/or distribution of the soil may differ across the heap in a continuous or discontinuous manner, or there may be one or more further soil heaps arranged to feed the same SRB.

In order that the present invention may be more fully understood, examples will now be given by the way of illustration only with reference to FIG. 1 of the accompanying drawing, which shows a schematic transverse cross section through a composite bioreactor according to the present invention.

Referring now to the drawing, the composite bioreactor 10 comprises an upper SOB bioreactor 12 and a lower SRB bioreactor 14 separated by a permeable membrane 16 which allows the passage of liquid but substantially no significant amounts of soil and an impermeable membrane 17 to maintain the integrity of the two reactors. The lower SRB bioreactor 14 comprises a trough 18 excavated from the surface 11 of the ground. The trough 18 is lined with a plastics material sheet 20 which is impervious to the liquors and chemicals employed. The trough is filled with a bed of packing material 22 of rubble and pebbles on which the impermeable membrane 17 rests. The bed supports the weight of soil in the SOB bioreactor and provides a substratum for the organisms to grow on. The SRB bioreactor trough 18 is provided with conduits 24, 26 at different levels, the conduits being connected to various pumps so as to be able to withdraw or inject liquids as appropriate into the SRB bioreactor. The conduits 24, 26 also serve to promote circulation of liquors in the trough, to supply and distribute a carbon source such as ethanol, and to supply and distribute an alkali such as sodium hydroxide in the trough so as to control pH in the SRB bioreactor. Pump 50 is coupled to the conduit 24 and is able to pump the extracted liquor/sludge either to a storage tank (not shown) for further processing or recirculate liquor to a conduit 28 where it may be supplied to the SOB bioreactor 12 at a desired level depending upon the stage which the remediation process has reached. Air pump 30 is used to supply air to aerate the SOB bioreactor 12 via conduit 32 to promote growth of bacteria and bioleaching of contaminants in the soil heap. Nutrients may be supplied to SOB reactor 12 from vessel 34 via pump 52 and conduit 28. The SOB bioreactor essentially consists of contaminated soil which is to be remediated. The soil may have mixed therewith micro-organisms, nutrients and sulfur to initiate the bioremediation process.

Although only two sets of supply/distribution conduits are shown, there may of course be more than this number depending upon the size of the composite bioreactor and upon the degree of control it is desired to exercise over the process. Where buried in the soil heap the conduits themselves may be of perforated form so as to distribute liquid or air as appropriate over as wide an area of the soil heap as possible.

Operation of the composite bioreactor will now be described assuming that the soil heap is contaminated with both organic and metal species pollutants.

The initial stage of remediation will be to degrade the organic molecules present and will be controlled to provide aerobic conditions by supplying air and nutrients mainly through the conduits 28 32 to the soil heap such that they slowly drain down through the SOB. Take-off conduit 38 may be used to recirculate liquor to the soil heap, e.g. as shown via pump 52, vessel 34 and conduit 28. The chemistry of degradation of organic molecules by biochemical processes is known and reference is made to our copending patent application WO95/22375, the content of which is included herein by reference.

While the organic contaminants are being degraded, the SRB bioreactor 14 is filled with a dilute sulphate liquor of pH 6 and the trough contents inoculated with a consortia of SRB. Ethanol or other suitable carbon source is fed to the SRB bioreactor and conditions produced to promote healthy growth of SRB. This growth period will require sulphate ions, nutrients and carbon source, any or all of which may be provided from one or more vessels such as 60 with an associated pump 58 coupled to the conduit 26. Mixing may be achieved by withdrawing liquor by the conduit 24 and pump 50, and re-injecting into the trough 18, e.g. via pump 50 and the conduit 26 to promote mixing and fluid movement. In order to sustain growth of the SRB, it may be necessary to remove some liquor to prevent conditions toxic to the SRB from arising.

Once the organic contaminants have been degraded, the process conditions may be adjusted to commence leaching out of the metal contaminant species in the soil. Appropriate nutrients are introduced into the soil heap from vessel 34 via pump 52 and conduit 28 to stimulate growth of SOB. As sulphuric acid is formed from the SOB growth, an acid front passes down the soil heap, thus liberating the metal species by conversion into the metal sulphate. Sulphide containing liquor from the base of the SRB bioreactor is recycled ahead of this acid front into a more alkaline region of the soil. Metal sulphides will be produced in the soil from the recycled liquor and the heavy meal pollutants in the soil without substantial evolution of hydrogen sulphide. The effect of this is to minimise evolution of hydrogen sulphide, thus allowing the SOB to oxidise the sulphide more efficiently and preventing significant quantities of hydrogen sulphide from leaking into the atmosphere.

The acid leachate which is percolating down through the soil heap may be collected in vessel 40 before being introduced into trough 18 at a controlled rate by pump 56. Effluent from the SRB bioreactor 14 may be fed into a storage vessel (*not shown) and may be treated (depending on the reactor parameters) before being recycled back into the soil heap via conduit 28. The recycled SRB liquor contains soluble sulfur containing compounds which provide nutrient for SOB growth and improve the economics of the process since the separate addition of sulfur is comparatively expensive. As the acid front eventually passes all the way through the depth of the soil heap, the metals will be removed as sulphates and converted into sulphides in the SRB bioreactor and precipitate out to form a sludge in the base of the trough from where it may be removed.

Also provided is a source 42 of an inert gas such as nitrogen, which is passed to the SRB via a conduit 36. This can be used to keep the SRB free of oxygen, e.g. when setting the SRB up, and also to remove any hydrogen sulphide gas formed in the SRB. Conduits (not shown) may also be provided between the SRB and the SOB, to conduct gases from the SRB for distribution (and recycling of sulfur when the gas is hydrogen sulphide) within the soil heap.

Once the soil heap has been decontaminated it may be removed for disposal as desired and replaced with a new contaminated soil heap and the process repeated.

What is claimed is:

1. A composite bioreactor for the remediation of soil containing one or more organic species and/or one or more metal species, the bioreactor including:
   (a) a first bioreactor comprising a heap of said soil to be remediated and having suitable sulfur oxidising microorganisms therein to react with and degrade soil contained contaminants;
   (b) a second bioreactor receiving liquid from the first bioreactor wherein said second bioreactor has suitable sulfur reducing microorganisms therein and is defined by a permeable membrane between said first and second bioreactors to allow passage of liquid but substantially no soil from the first to the second bioreactor; and
   (c) a liquid nutrient supply means for providing a flow to said bioreactor to enable microorganism reaction over time for soil remediation.

2. A composite bioreactor according to claim 1 wherein a support means cooperative with said permeable membrane maintains the integrity of the reactors.

3. A composite bioreactor according to claim 2 wherein said bioreactor is received in a pit excavated into a ground surface.

4. A composite bioreactor of claim 3 having a sheet material membrane in said pit to contain and isolate said bioreactor.

5. A composite bioreactor according to claim 1 wherein support means positions said first bioreactor over said second bioreactor to enable gravity feed of partially remediated liquid to said second bioreactor.

6. A composite bioreactor according to claim 5 wherein said support means comprises a metal grid below said permeable membrane to enable permeation into said second bioreactor.

7. A composite bioreactor according to claim 1 wherein the soil heap is provided with conduits therein to supply fluid flow.

8. A composite bioreactor according to claim 1 wherein the second bioreactor has conduits arranged in two or more different levels to encourage liquid circulation therein, and also including:
   (a) a source of carbon for the second bioreactor; and
   (b) an alkali feed to said second bioreactor.

9. A composite bioreactor according to claim 1 wherein the second bioreactor is provided with liquid extraction conduits at least near to its base and near said permeable membrane.

10. A composite bioreactor according to claim 9 including supply conduits arranged in said first bioreactor.

11. A composite bioreactor according to claim 1 wherein said first bioreactor receives the soil heap beyond the said second bioreactor to form a seal against escape of gas from said second bioreactor.

12. A method for the remediation of soil polluted by one or more organic species and/or one or more metal species by biodecontamination techniques, the method comprising the steps of:
   (a) providing trough means with an opening in said trough;
   (b) providing support means having a permeable membrane across said opening;
   (c) heaping soil to be decontaminated on top of said permeable membrane wherein said soil has therein sulfur oxidizing bacteria to promote growth of bacteria to initially degrade organic contaminants within said soil heap, where present;
   (d) providing a liquid nutrient supply to said soil under conditions to promote growth of said sulfur oxidizing bacteria enabling generation of sulfur based acids to react with one or more metal species to form metal sulphate(s);
   (e) flowing leachate comprising said sulphate(s) from said soil heap through said membrane into said trough means while retaining the soil above said permeable membrane; and
   (h) in said trough means, using sulphate reducing bacteria to convert said sulphate leachate to a metal sulphide.

13. A method according to claim 12 wherein, after the step of converting to a metal sulphide, liquid from said leachate is returned to said soil heap.

14. A composite bioreactor for the remediation of soil containing one or more organic species and/or one or more metal species, the bioreactor including:
   (a) a first bioreactor enclosing a captured heap of soil to be remediated and having suitable sulfur oxidising microorganisms therein to react with and degrade soil contained contaminants;
   (b) a second bioreactor beneath said first bioreactor for receiving liquid from the first bioreactor wherein said second bioreactor has suitable sulfur reducing microorganisms therein and there is a permeable membrane between said first and second bioreactors to allow gravity liquid flow from the first to the second bioreactor; and (c) a liquid nutrient supply providing a flow to said first bioreactor to enable microorganism reaction over time for soil remediation.

15. A composite bioreactor according to claim 14 wherein a support means cooperative with said permeable membrane maintains the integrity of the reactors.

16. A composite bioreactor according to claim 15 wherein said bioreactor is received in a pit excavated into a ground surface.

17. A composite bioreactor of claim 16 having a sheet material membrane in said pit to contain and isolate said bioreactor.

18. A composite bioreactor according to claim 15 wherein said support means comprises a metal grid below said permeable membrane to enable permeation into said second bioreactor.

19. A composite bioreactor according to claim 15 wherein the soil heap is aerated by a supply conduit therein to supply fluid flow.

20. A composite bioreactor according to claim 14 wherein the second bioreactor has conduits arranged in two or more different levels to encourage liquid circulation therein, also including:

(a) a source of carbon for the second bioreactor; and (b) an alkali feed to said second bioreactor.

* * * * *